Patented Sept. 15, 1953

2,652,409

UNITED STATES PATENT OFFICE 2,652,409

OXYALKYLATION OF THE AMIDES OF SECONDARY AMINES

Melvin De Groote, St. Louis, Mo., assignor to Petrolite Corporation, Wilmington, Del., a corporation of Delaware No Drawing. Application October 17, 1951, Serial No. 251,831

5 Claims. (Cl. 260—404)

This invention is concerned with the treatment of certain water-insoluble amides, as hereinafter described, with an alpha-beta alkylene oxide having not over 4 carbon atoms, such as ethylene oxide, so as to render such product water-soluble or emulsifiable by conversion into derivatives, as hereinafter described. The particular amides subjected to such treatment are amides of certain secondary amines. Such amides are characterized by the absence of any reactive hydrogen atom.

It is common practice to treat water-insoluble materials, such as acids, amides, alcohols, phenols, mercaptans and the like, with an alkylene oxide, particularly ethylene oxide, so as to introduce a hydrophile radical. All such compounds are characterized by the fact that they have a reactive hydrogen atom, i. e., a hydrogen atom attached to oxygen, nitrogen, or sulfur.

I have found that valuable emulsifying agents can be obtained by the oxyalkylation of certain amides, even though such amides do not contain a reactive hydrogen atom. Examples of such amides are the higher fatty acid amides of diethylamine, dipropylamine, dibutylamine, diamylamine, dicyclohexylamine, dihexylamine, dioctylamine, etc. Other examples are the comparable amines, in which the radicals are dissimilar, such as the secondary amines, in which one radical is an ethyl radical and the other propyl, or one is propyl and one is butyl, or one is butyl and one is amyl, etc. For convenience, the secondary amine may be indicated thus:

$$\begin{array}{c} R \\ \diagdown \\ NH \\ \diagup \\ R \end{array}$$

in which R represents an alkyl or alicyclic saturated hydrocarbon radical having 2 to 10 carbon atoms. Such secondary amines can be reacted with a monocarboxy acid or its equivalent, so as to yield an amide of the following composition:

in which R₁CO is the acyl radical of a monocarboxy detergent-forming acid having 8 to 20 carbon atoms. Such acids are exemplified by the higher fatty acids, various naphthenic acids, and resin acids, such as abietic acid, hydrogenated abietic acids, etc. Such acids are characterized by the fact that they combine with alkalies to produce soap and soap-like materials. Thus, they are frequently referred to as detergent-forming acids.

Re-examining the last formula previously referred to, it is to be noted that such product does not contain a reactive hydrogen atom. I have found, however, that such amide, even though water-insoluble and showing no appreciable tendency to emulsify prior to treatment with an alkylene oxide, can be treated with an alkylene oxide, particularly ethylene oxide, so as to obtain a water-soluble product which seems to be a mixture and the exact nature of which is not known at the moment. Presumably, in part, the product would appear to be the resultant of the reaction, where the ethylene oxide enters at the carbonyl carbon position in a manner indicated thus:

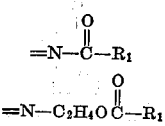

After the introduction of the first mole of alkylene oxide, such as ethylene oxide, it would be immaterial where the next mole entered, whether between the carbonyl carbon atom and the adjacent oxygen atom, or between this particular oxygen atom and the adjacent carbon atom, or whether rupture occurred between the nitrogen atom and the carbon atom. Actually, it is believed that the rupture takes place at a point adjacent to the carbonyl carbon atom.

The reactions which actually take place during oxyethylation, may be more complicated than indicated by the previous simpler suggestions. For instance, in my co-pending application, Serial No. 59,769, filed November 12, 1948, now Patent No. 2,602,087 I pointed out that a similar reaction takes place when one oxyalkylates an ester of an aminoalcohol of the following composition:

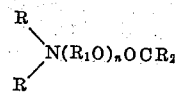

in which R is a member selected from the class of alkyl and saturated alicyclic hydrocarbon radicals having at least 2 and not over 10 carbon atoms; R₁O is the divalent radical in which R₁O is a member selected from the class consisting of ethylene radicals, propylene radicals, butylene radicals, hydroxypropylene radicals and hydroxybutylene radicals, and n is a number varying from 1 to 3; R₂CO is the acyl radical of a monocarboxy detergent-forming acid having 8 to 20 carbon atoms.

If in the instant case all that happened was that the first mole of the alkylene oxide, such as ethylene oxide, entered in the manner suggested previously by the following formula

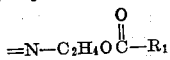

then the initial product of reaction would be the same identical product as described in the aforementioned co-pending application. Stated another way, in my co-pending application I might start, for example, with the oleyl or stearyl ester of dibutylethanolamine. In the instant case I might start with dibutyl oleylamide or stearamide; employing one mole of ethylene oxide there would be introduced the divalent ethanol radical between what was formerly the amido nitrogen atom and the acyl radical. If this actually took place, then the resultant would be the same as the intial reactant in the aforementioned co-pending application. Actually, the products obtained by oxyalkylating these two comparable raw materials, yield derivatives or mixtures of derivatives which are distinctly dissimilar.

Considering for a moment, however, that such ester linkage could be formed, even so, further oxyalkylation seems to indicate greater complexity. For instance, there may be a rupture involving one fragment at the carbonyl carbon atom, and another fragment at the adjoining oxygen atom. This is shown in the following manner:

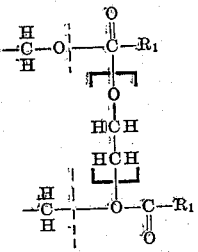

One valency bond is severed, as indicated by broken line, and replaced by valency bond connected with the divalent ethoxy radical. Obviously, it is not intended to show any abnormal valency for carbon.

Assuming that part of the reaction or reactions may be explained by a rupture, as above indicated, it is a matter of further speculation as to what happens to the two amino-alcohol residues, as differentiated from the acyl and acyloxy residues. The two might simply unite, as indicated in the following manner:

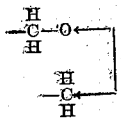

or it might be possible, of course, that another mole of ethylene oxide furnishes a connective divalent radical, as indicated in the following:

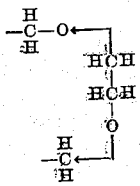

As stated, I do not known the composition completely and regard it as a mixture and it probably represents, at least in part, other reaction products in addition to those which have been briefly indicated. Regardless of the composition, it is to be noted that my invention is directed to the substantial fact that I have found that these particular amides, free from reactive hydrogen atoms, are susceptible to oxyalkylation, and such products are of utility, particularly for use as emulsifiers for oil-in-water emulsions.

Previous reference has been made to the higher fatty acids which represent my preferred reactants. The higher fatty acids include caprylic acid, capric acid, lauric acid, myristic acid, palmitic acid, stearic acid, as well as hydroxystearic acid, dihydroxystearic acid, trihydroxystearic acid, etc., as well as the unsaturated higher fatty acids, such as oleic acid, linoleic acid, linolenic acid, ricinoleic acid, etc. Previous reference has been made to the use of naphthenic acids, and particularly naphthenic acids of commerce in the two grades ordinarily available, to wit, 220–230 acid number and 230–240 acid number. The invention can be illustrated by such examples as the oleic acid ester, ricinoleic acid ester, or linoleic acid ester of diethylethanolamine or dibutylethanolamine. The following examples illustrate the oxyalkylation procedure, particularly oxyethylation, which is comparatively simple and more or less conventional, and is employed in reacting compounds which happen to have a reactive hydrogen atom.

There may be an anomaly in the fact that reference has been made to the absence of reactive hydrogen atoms in the ester which is subjected to oxyalkylation, and at the same time esters of ricinoleic acid, hydroxystearic acid, and the like have been included. Ethylene oxide reacts with primary alcohols. Apparently, however, under ordinary conditions of reaction or even under the more drastic conditions of reaction herein described, ethylene oxide or the other alkylene oxides do not react with the secondary alcoholic radical which is part of an acyl radical, as in the case of ricinoleic acid, hydroxystearic acid, etc. In fact, if ricinoleic acid or ethyl ricinoleate is subjected to oxyalkylation, particularly oxyethylation, one does not obtain a compound in which the alcoholic hydroxyl of the ricinoleyl radical has been attacked.

The same applies in connection with the compounds herein described, if one happens to employ an ester in which the ricinoleyl or similar group is present. If the final product is subjected to saponification and then acidified and extracted so as to recover the fatty acid as such, examination of the fatty acid reveals that it is the unaltered original fatty acid and not the fatty acid of the following type:

$$H(OR_1)_nOR_3COOH$$

wherein $R_1O$ represent a divalent alkylene oxide radical and $HOR_3COOH$ represents ricinoleic acid, hydroxystearic acid, or the like.

The selected amide is placed in a stirring autoclave and subjected to treatment with ethylene oxide or one of the other similar alkylene oxides as noted. Since these amides are not basic, it is desirable to add an alkaline catalyst, in order to effect oxyalkylation. Any of the usual alkaline catalysts employed in oxyalkylation may be used, for example, caustic soda, caustic potash, soap, carbonates, sodium methylate, etc. It has been found that 2% of sodium methylate, based on the weight of the amide, is satisfactory. The mixture of the amide and sodium methylate was placed in a stirring autoclave and ethylene oxide added batch-wise. Generally speaking, the time required for the addition of 150 grams of ethylene oxide to 400 or 500 grams of the amide, is about two hours, operating at a temperature of about 150° to 175° C., and a gauge pressure of up to 200 pounds per square inch. As the reaction becomes complete, the pressure drops to a very low value. In some instances, the reaction mass is nonhomogeneous and it has been found desirable to add some of the diethylether of diethyleneglycol in order to promote homogeneity. The procedure is illustrated by the following examples:

Example 1

| | Grams |
|---|---|
| Dibutyloleylamide | 400 |
| Sodium methylate | 8 |
| Ethylene oxide (5 portions of 150 g. each) | 750 |

| Time | Temperature, °C. | Pressure, p. s. i. | |
|---|---|---|---|
| 2:20 | 100 | 150 | |
| 2:25 | 150 | 205 | |
| 2:50 | 175 | 25 | Emulsifiable. |
| 3:35 | 120 | 155 | |
| 3:40 | 150 | 200 | |
| 3:50 | 175 | 60 | |
| 4:05 | 155 | 35 | Non-homogeneous, viscous to semi-solid, grainy, black product; emulsifiable. Added diethylether of diethyleneglycol—100 grams. |
| 9:55 | 100 | 150 | |
| 10:00 | 150 | 185 | |
| 10:15 | 170 | 30 | Emulsifiable—not soluble. |
| 3:30 | 100 | 115 | |
| 3:35 | 150 | 170 | |
| 4:10 | 170 | 20 | Emulsifiable, non-homogeneous, waxlike, grainy black product. |
| 10:10 | 100 | 100 | |
| 10:15 | 150 | 120 | |
| 10:25 | 160 | 125 | |
| 11:00 | 170 | 20 | Separates into 2 layers but is homogeneous temporarily after being mixed together. Both layers are soluble and emulsifiable and are surface-active. The appearance of the solid on separation is almost waxy. |

Example 2

| | Grams |
|---|---|
| Dibutyl lauramide | 299 |
| Sodium methylate | 6 |
| Ethylene oxide (4 portions of 100 grams each) | 400 |

| Time | Temperature, °C. | Pressure, p. s. i. | |
|---|---|---|---|
| 3 hours | 160 | 150 | Water-emulsifiable liquid. |
| Do | 165 | 165 | Non-viscous, water-emulsifiable liquid. |
| 3½ hours | 155 | 180 | Do. |
| Do | 160 | 155 | Do. |

The final product separated into two layers, both of which are water-soluble and serve as emulsifying agents, and both of which are soluble in the diethylether of diethyleneglycol. If desired, the mixture can be stirred and used while being agitated, so as to get adequate portions of both layers, or either layer can be employed separately.

Example 3

| | Grams |
|---|---|
| Dibutyl stearamide | 284 |
| Sodium methylate | 5.5 |
| Ethylene oxide (3 portions of 100 gr. each) | 300 |

| Time | Temperature, °C. | Pressure, p. s. i. | |
|---|---|---|---|
| 3 hours | 165 | 142 | Water-emulsifiable non-viscous liquid. |
| 7½ hours | 160 | 180 | Do. |
| 7 hours | 160 | 170 | Water-emulsifiable non-viscous oil. |

The final product separated into two layers, both of which are water-soluble and serve as emulsifying agents, and both of which are soluble in the diethylether of diethyleneglycol. If desired, the mixture can be stirred and used while being agitated, so as to get adequate portions of both layers, or either layer can be employed separately.

Example 4

| | Grams |
|---|---|
| Diethylstearamide | 320.2 |
| Sodium methylate | 6.0 |
| Ethylene oxide (6 portions of 100 grams each) | 600 |

| Time | Temperature, °C. | Pressure, p. s. i. | |
|---|---|---|---|
| ½ hour | 160 | 142 | Non-viscous, water-emulsifiable liquid. |
| 4 hours | 160 | 172 | Do. |
| 7 hours | 155 | 190 | Do. |
| 6 hours | 160 | 135 | Non-viscous, water-emulsifiable liquid becoming water-soluble. |
| 5 hours | 160 | 140 | Non-viscous, water-soluble liquid. |

The final product separated into two layers, but the lower layer was a rather viscous liquid and the upper layer was somewhat thinner. If desired, the mixture can be stirred and used while being agitated, so as to get adequate portions of both layers, or either layer can be employed separately.

Example 5

| | Grams |
|---|---|
| Dicyclohexyllauramide | 360 |
| Sodium methylate | 7 |
| Ethylene oxide (5 portions of 100 grams each) | 500 |

| Time | Temperature, °C. | Pressure, p. s. i. | |
|---|---|---|---|
| 2 hours | 165 | 175 | |
| 4 hours | 160 | 160 | |
| 3 hours | 160 | 170 | |
| 5 hours | 160 | 152 | |
| Do | 160 | 145 | Non-viscous, water-soluble liquid. |

When propylene oxide was used, the amount of alkylene oxide was increased one-third over the values where ethylene oxide was employed, i. e., 200 grams of propylene oxide were used to replace 150 grams of ethylene oxide. Propylene oxide does not give nearly as satisfactory a product, due to lesser water-solubility. It is most advantageous to use either ethylene oxide alone, or a mixture of ethylene oxide and propylene oxide, particularly using propylene oxide in the early batches and ethylene oxide in the later batches. When propylene oxide is used, the pressure may be less, due to the lower vapor tension of propylene oxide, but its reactivity is lower and the time required may be two or three times that required with ethylene oxide. Sometimes slightly higher temperatures must be employed with propylene oxide. For various reasons, the most desirable, the cheapest and the most effective alkylene oxide is ethylene oxide. The objection to glycide is its expense and the extreme care with which it must be handled.

Some of the amides employed as raw materials, for instance, the higher fatty acid amides, such as dibutyl-oleylamide, diethylstearamide, dibutylstearamide, diethyllauramide can be distilled and are readily available as pale amber or reddish-amber liquids which darken readily in the presence of air, or sometimes due to the action of light alone. The products obtained by oxyalkylation vary from greyish brown pasty and waxy solids, at ordinary room temperature, to others which are somewhat more liquid in appearance and of a reddish-amber tinge. In some instances, the solvents indicated as being added for purpose of convenience, reduce the products to viscous liquids, but in other instances, simply leave them as solids, perhaps a heterogeneous mixture of two different melting points, one being a waxy grey solid and the other an amber-colored liquid. In most instances, merely warming the mass moderately, for instance, to 35° to 60° C., produces complete solubility and makes the product homogeneous.

It is to be noted that the amides, prior to oxyalkylation, are insoluble. Since the amides are not particularly alkaline, this is apt to be true, even if the water is slightly acidulated.

The products, as prepared, will make a solution with warm distilled water, using 1 to 5 parts of the oxyalkylated derivative mixture and 95 to 99 parts of warm distilled water (temperature 30° to 50° C.) to give a permanent sol or solution. In some instances, this solution is practically clear and transparent. This test applies whether the product is used as such, or whether it has been mixed with xylene and the diethyl-ether of diethyleneglycol, as previously pointed out. Such mixtures are by weight.

This application is in part a continuation of my application Serial No. 59,770, filed November 12, 1948, now abandoned.

I claim:
1. The process of rendering water-insoluble amides water-dispersible by reaction with an alkylene oxide; said water-insoluble amide, prior to oxyalkylation, being of the following formula:

in which R is a member selected from the class consisting of alkyl and saturated alicyclic hydrocarbon radicals having at least 2 and not over 10 carbon atoms; $R_1CO$ is the acyl radical of a monocarboxy detergent-forming acid having 8 to 20 carbon atoms; said amide being characterized by the absence of labile hydrogen atoms which are reactive towards low molal alkylene oxides; said reaction being carried out by subjecting the amide to the action of the alkylene oxide under oxyalkylating conditions of temperature and pressure, the alkylene oxide having at least 2 and not more than 4 carbon atoms selected from the class consisting of ethylene oxide, propylene oxide, butylene oxide, glycide and methylglycide, and being at least sufficient to render the water-insoluble amide water-dispersible to a degree sufficient to give a permanent solution in a mixture containing 1% to 5% of the oxyalkylated derivative mixture and 95% to 99% of warm distilled water.

2. The process of claim 1, wherein R is alkyl.
3. The process of claim 1, wherein R is alkyl and $R_1CO$ is the acyl radical of a higher fatty acid.
4. The process of claim 1, wherein R is alkyl and $R_1CO$ is the acyl radical of an unsaturated higher fatty acid.
5. The process of claim 1, wherein R is alkyl, $R_1CO$ is the acyl radical of an unsaturated higher fatty acid, and the alkylene oxide used in the oxyalkylation reaction is ethylene oxide.

MELVIN DE GROOTE.

References Cited in the file of this patent

UNITED STATES PATENTS

| Number | Name | Date |
|---|---|---|
| 1,924,698 | Neelmeier et al. | Aug. 29, 1933 |
| 1,970,578 | Schoeller et al. | Aug. 21, 1934 |
| 1,985,424 | Piggott | Dec. 25, 1934 |
| 2,002,613 | Orthner et al. | May 28, 1935 |